US010825366B1

(12) United States Patent
Yang (10) Patent No.: US 10,825,366 B1
(45) Date of Patent: Nov. 3, 2020

(54) ROTATION STRUCTURE OF LAMP DECORATION

(71) Applicant: Chin-Sheng Yang, Tainan (TW)

(72) Inventor: Chin-Sheng Yang, Tainan (TW)

( * ) Notice: Subject to any disclaimer, the term of this patent is extended or adjusted under 35 U.S.C. 154(b) by 0 days.

(21) Appl. No.: 16/666,411

(22) Filed: Oct. 29, 2019

(51) Int. Cl.
| | |
|---|---|
| *F21V 33/00* | (2006.01) |
| *G09F 19/02* | (2006.01) |
| *F21V 3/00* | (2015.01) |
| *G09F 19/12* | (2006.01) |
| *F16H 1/20* | (2006.01) |
| *H02K 7/116* | (2006.01) |
| *F21W 121/00* | (2006.01) |

(52) U.S. Cl.
CPC ............... *G09F 19/02* (2013.01); *F16H 1/20* (2013.01); *F21V 3/00* (2013.01); *G09F 19/12* (2013.01); *F21W 2121/00* (2013.01); *H02K 7/116* (2013.01)

(58) Field of Classification Search
CPC ........ F21S 10/002; F21S 10/007; F21V 33/00
USPC ....................................................... 362/101
See application file for complete search history.

(56) References Cited

U.S. PATENT DOCUMENTS

| | | | | | |
|---|---|---|---|---|---|
| 6,132,284 | A | * | 10/2000 | Lin | ......................... A63H 13/12 40/426 |
| 6,508,022 | B2 | * | 1/2003 | Huang | .................... G09F 19/08 40/406 |
| 9,022,593 | B2 | * | 5/2015 | Yang | ...................... F21S 10/002 362/101 |
| 2004/0229541 | A1 | * | 11/2004 | Liao | ......................... G09F 19/02 446/267 |
| 2004/0244243 | A1 | * | 12/2004 | Tien | ......................... G09F 19/02 40/410 |
| 2008/0025026 | A1 | * | 1/2008 | Lee | ........................ F21S 10/002 362/253 |

* cited by examiner

*Primary Examiner* — Matthew J Peerce
(74) *Attorney, Agent, or Firm* — Leong C. Lei (57) ABSTRACT

A rotation structure of a lamp decoration, which mainly comprises: a water-lamp main-body, a rotation mechanism, and a bottom seat; wherein the water-lamp main-body is internally filled with a slightly thick flowable liquid, and the water-lamp main-body is downwardly set with a recess. A rotation mechanism is set in the recess and has a first magnetic-disk, a plurality of gears, a fluid toggling-disk, and a rotating-body. The bottom seat correspondingly fixed and connected under the water-lamp main-body, and a second magnetic-disk is set inside the bottom seat to correspondingly attract with the first magnetic-disk magnetically. When the second magnetic-disk is rotated, the first magnetic-disk is magnetically attracted to rotate and drives the other gears to act; thereby disturbing the liquid inside the water-lamp main-body to produce a beautiful visual effect.

8 Claims, 7 Drawing Sheets

ROTATION STRUCTURE OF LAMP DECORATION

(a) TECHNICAL FIELD OF THE INVENTION

The present invention relates to a water-lamp decoration ornament, and especially relates to the kind having a rotation structure that can disturb the liquid flow inside the water-lamp, so that it can produce a beautiful visual effect.

This application is a reinvention application by the inventor in accordance with U.S. Pat. No. 9,022,593 B2.

(b) DESCRIPTION OF THE PRIOR ART

Generally, according to the decoration ornaments which are often decorated on the table in daily life, it is nothing more than photo frames, toy ornaments, etc.; and all the ornaments only have aesthetically pleasing static functions. Therefore, there is a water-lamp design with sequins, bright powders or ornaments inside, which uses artificial inverted shaking or electrical power to make the internal sequins, bright powders or ornaments create a liquid-flow visual experience. Thus, it also has different visual effects due to different objects inside the water-lamp, which makes it have an expandable space, and can extend the effects of various visual changes or develop versatility and fun. Therefore, the design of the water-lamp is a topic that needs to be specially developed by the researchers of environmental decoration ornaments.

SUMMARY OF THE INVENTION

Therefore, the present invention relates to a rotation structure of a lamp decoration, which mainly comprises: a water-lamp main-body suitably shaped to have a main-body that is hollow and transparent and has an opening and a transparent bottom-cover that closes the opening; wherein the main-body is internally filled with a slightly thick flowable liquid, and the bottom-cover is downwardly set with a recess; a rotation mechanism set in the recess; wherein the rotation mechanism sequentially has a first magnetic-disk, a gear seat, a fluid toggling-disk, and a rotating-body; wherein a plurality of first magnetic-pieces are set on the bottom of the first magnetic-disk, and a riving gear is set on the top of the first magnetic-disk; wherein a driveshaft is upwardly set in the driving gear; wherein the gear seat is set with a platform fixed and set with the driveshaft, and the bottom of the platform is set with a first gear meshing with the driving gear; wherein a second gear is set on the top of the platform, and the bottom of the second gear is combined with the first gear; wherein the fluid toggling-disk is set on the top of the gear seat, and a plurality of radial fin-pieces are set on the periphery of the fluid toggling-disk, wherein a tugging gear meshing with the gear seat is set on the bottom of the fluid toggling-disk; wherein the driveshaft is passed through and set the fluid toggling-disk to combine with the rotating-body; and a bottom seat correspondingly fixed and connected under the water-lamp main-body, and the bottom seat has a upward opening; wherein a second magnetic-disk is set inside the bottom seat; wherein the second magnetic-disk is set with a plurality of second magnetic-pieces, which quantity is equal to the first magnetic-piece, and are magnetically opposite to each of the first magnetic-pieces to correspondingly attract with each other magnetically; wherein a power piece is further set for driving the second magnetic-disk to rotate.

When the second magnetic-disk is under rotated state, the first magnetic-disk is magnetically attracted to rotate and drives the driving gear to rotate; thereby pulling the first gear, second gear, and the tugging gear to act, and thus moving together the fluid toggling-disk and the rotating-body to rotate; then, the fin-piece of the fluid toggling-disk disturbs the liquid inside the water-lamp main-body, and the rotating-body will be rotated synchronously to increase the visual feeling of the present invention.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

The foregoing and other aspects, features, and utilities of the present invention will be best understood from the following detailed description of the preferred embodiments when read in conjunction with the accompanying drawings.

Please refer to FIG. 1 to FIG. 5, a rotation structure of a lamp decoration according to a preferred embodiment of the present invention, which comprises: a water-lamp main-body (1), a rotation mechanism (2), and a bottom seat (3), wherein:

The water-lamp main-body (1) is suitably shaped to have a main-body (11) that is hollow and transparent and has an opening and a transparent bottom-cover (12) that closes the opening. The main-body (11) is internally filled with a slightly thick flowable liquid, sequins, and bright powders, wherein the bottom-cover (12) is downwardly set with a recess (13); and in this embodiment, the water-lamp main-body (1) is a sphere, but is not limited thereto.

The rotation mechanism (2) sequentially has a first magnetic-disk (21), a gear seat (22), a fluid toggling-disk (23), and a rotating-body (24); wherein the first magnetic-disk (21) has a round disk shape, and a plurality of first magnetic-pieces (211) are embedded and set on the bottom thereof. The first magnetic-piece (211) is a magnet, and the top of the first magnetic-disk (21) is set with a driving gear (212); and a driveshaft (213) is upwardly embedded and set in the center of the driving gear (212). The first magnetic-disk (21) is set in the recess (13), and the first magnetic-pieces (211) are attached to the bottom of the recess (13). In this embodiment, the driving gear (212) is integrally extended by the first magnetic-disk (21), but is not limited thereto.

The gear seat (22) is a cylindrical shape with an open bottom, and the top of the gear seat (22) is set with a platform (221); wherein a contacting-connecting portion (222) is ringly set on the outer edge of the top outwardly. The center of the platform (221) is set with a fixing hole (223), and the fixing hole (223) is passed through and set on the driveshaft (213); wherein the contacting-connecting portion (222) is contacted and connected on the bottom-cover (12), and the platform (221) is further set with a through-hole (224) and a shaft-rod (225). The bottom of the platform (221) is set with a first gear (G1) meshing with the driving gear (213), and a second gear (G2) is set on the top of the platform (221); wherein a guiding shaft (226) is extended at the bottom of the second gear (G2), and the guiding shaft (226) is combined with the first gear (G1) by passing through the through-hole (224), such that the second gear (G2) can be moved together with the first gear (G1).

A third gear (G3) is further pivotally set on the guiding shaft (226) above the gear seat (22), wherein the bottom of the third gear (G3) is set with a transfer gear (G4), and the third gear (G3) is meshed with the second gear (G2) by the transfer gear (G4); and the outer diameter of the transfer gear (G4) is smaller than the outer diameter of the third gear (G3).

Figure 1:
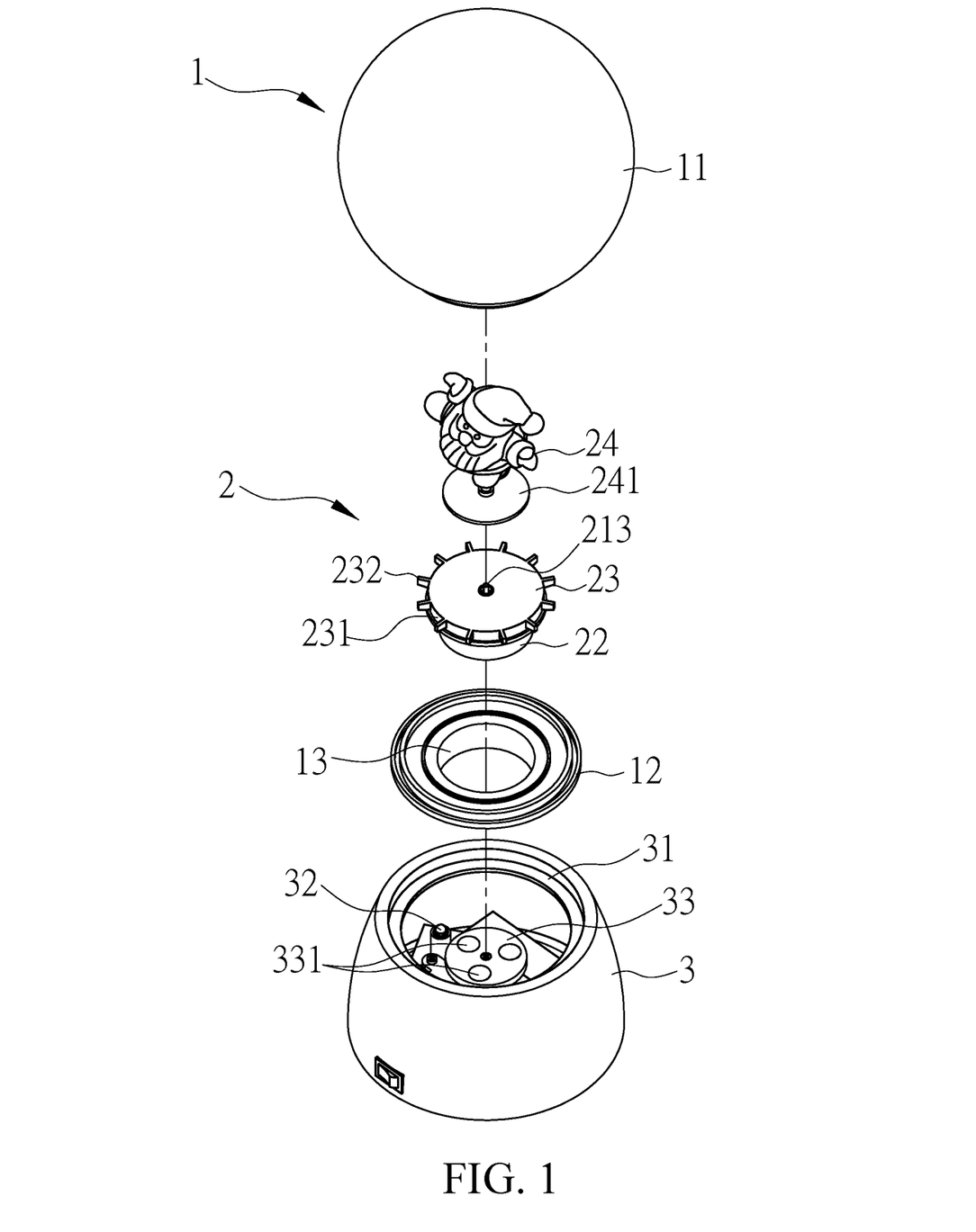
FIG. 1 is a stereoscopic decomposition schematic diagram of the present invention.
Figure 2:
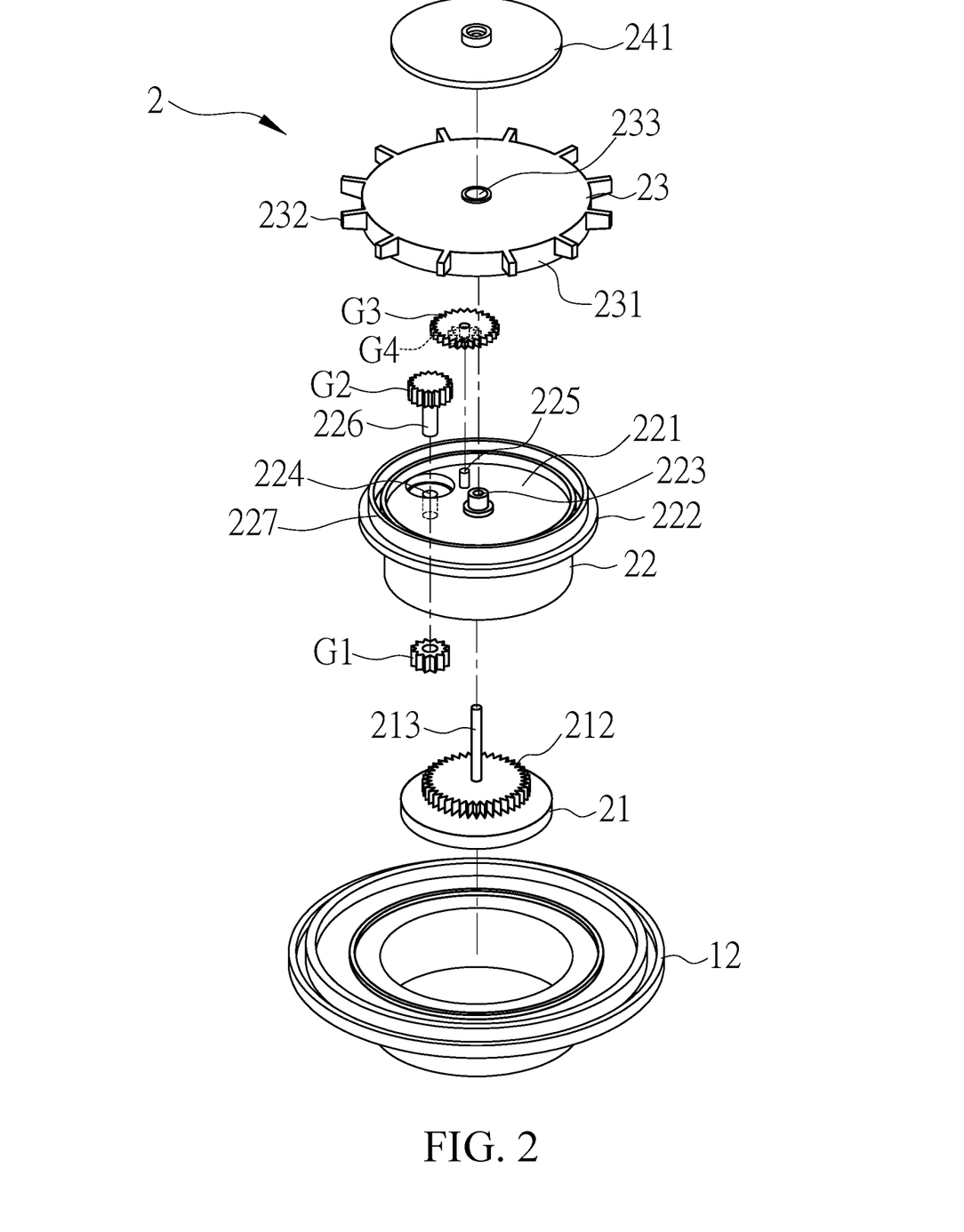
FIG. 2 is a partial stereoscopic decomposition schematic diagram of the present invention.
Figure 3:
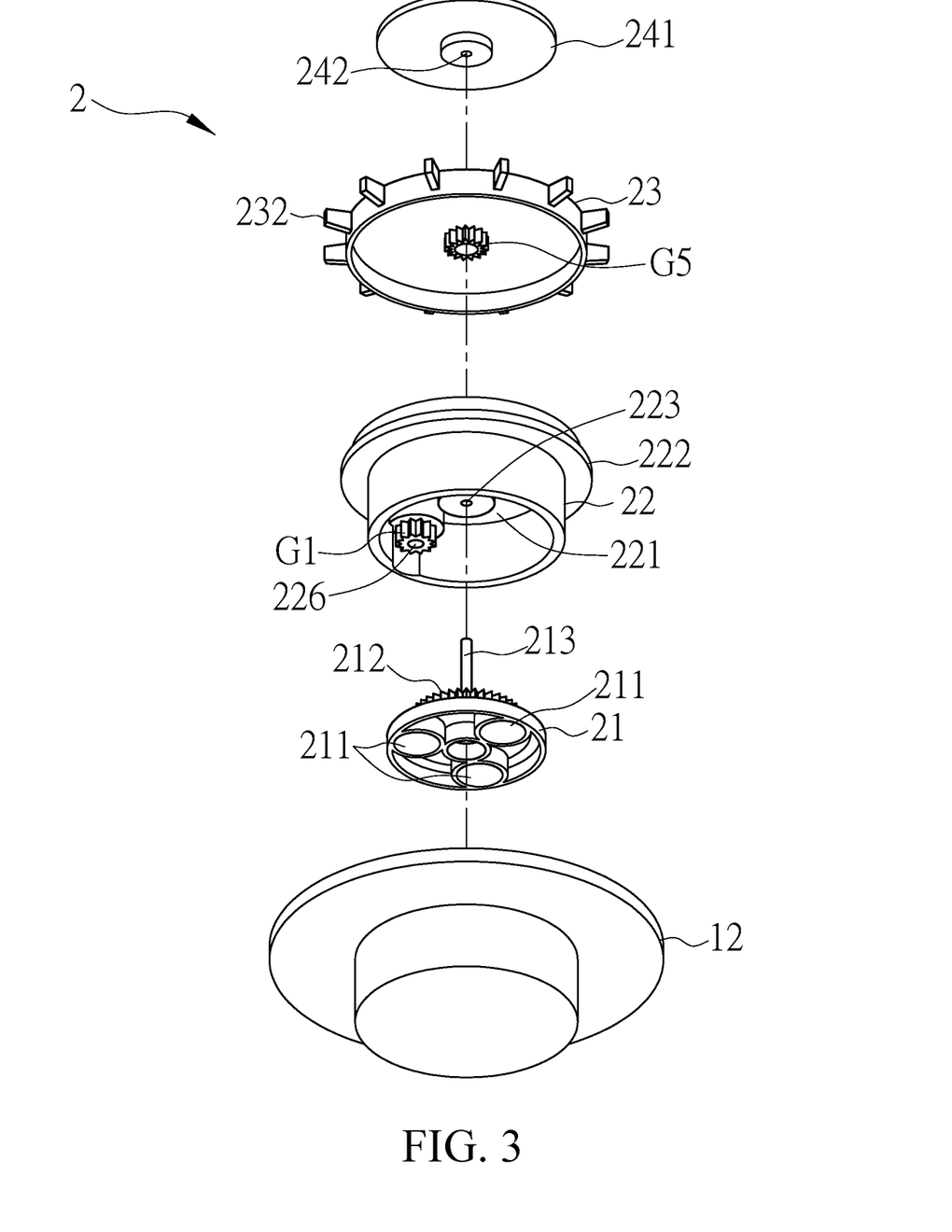
FIG. 3 is a partial stereoscopic decomposition schematic diagram of the present invention.
Figure 4:
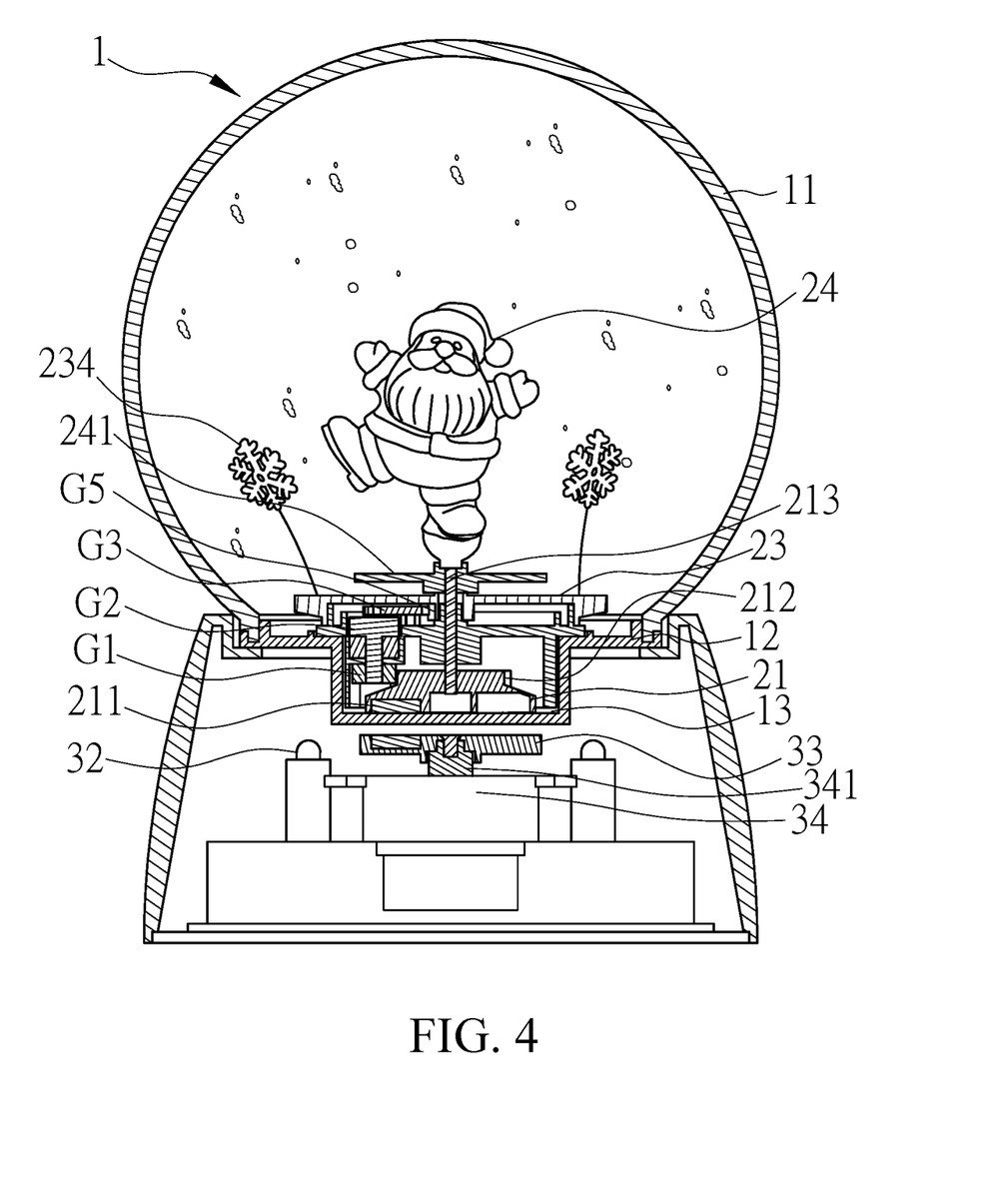
FIG. 4 is a sectional schematic diagram of the present invention.
Figure 5:
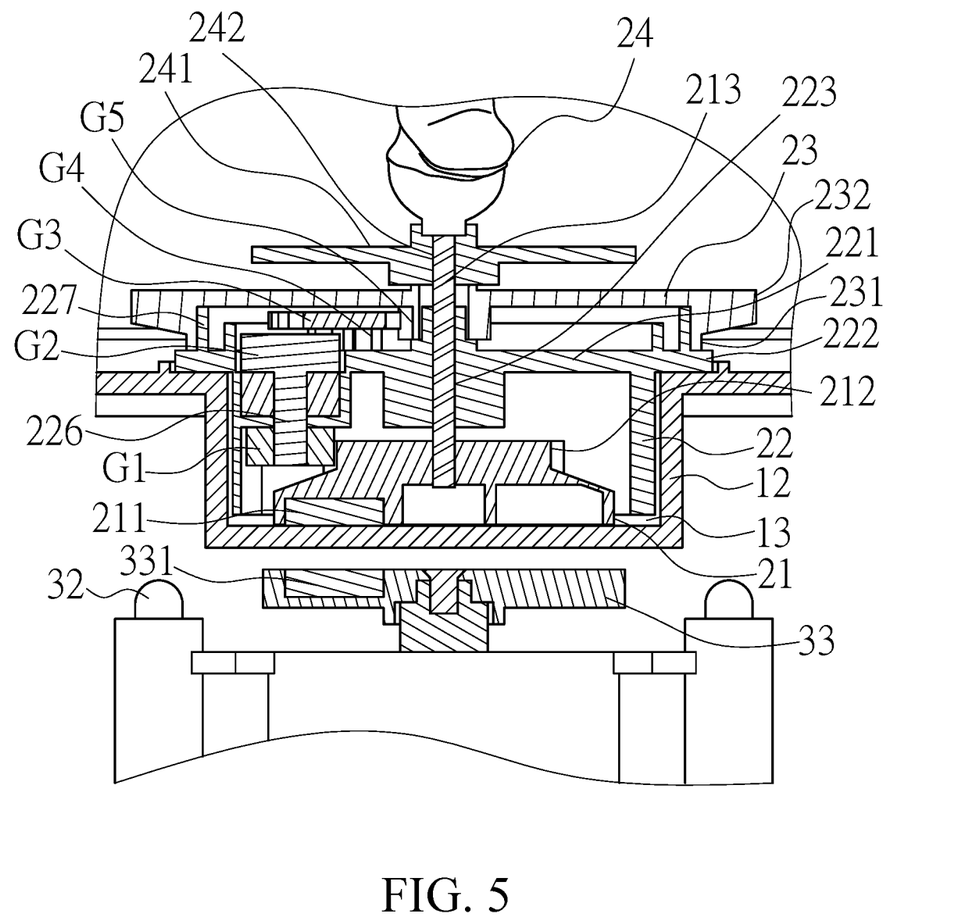
FIG. 5 is a partially enlarged view of FIG. 4.

The top of the gear seat (22) is set with a position-limit ring (227), wherein the fluid toggling-disk (23) downwardly extends a ring wall (231); and the ring wall (231) is covered and set on the position-limit ring (227) on the top of the gear seat (22); wherein a plurality of radial fm-pieces (232) are set on the periphery of the ring wall (231). The center of the bottom of the fluid toggling-disk (23) integrally extends a tugging gear (G5) meshing with the third gear (G3), and the center of the fluid toggling-disk (23) is set with a through-hole (233); wherein the driveshaft (213) is passed through and set the through-hole (233) to combine with the rotating-body (24); in this embodiment, the rotating-body (24) is a three-dimensional doll, and a bottom-disk (241) is set at the bottom thereof; wherein the bottom-disk (241) is set with a through-hole (242) for providing the driveshaft (213) to be embedded and set. As shown in FIG. 4, the periphery of the fluid toggling-disk (23) is set with a plurality of decorative pieces (234) which can assist in disturbing the liquid in the water-lamp main-body (1).

The bottom seat (3) is correspondingly fixed and connected under the water-lamp main-body (1), and the recess (13) of the bottom-cover (12) is located inside the bottom seat (3); wherein the bottom seat (3) has a upward opening (31), and at least one light source (32) and a second magnetic-disk (33) are set inside the bottom seat (3). The second magnetic-disk (33) is set with a plurality of second magnetic-pieces (331), which quantity is equal to the first magnetic-piece (211), and are magnetically opposite to each of the first magnetic-pieces (211); wherein a power piece (34) is further set for driving the second magnetic-disk (33) to rotate; in this embodiment, the power piece (34) is a motor having a motor rotating-shaft (341) combined with the second magnetic-disk (33); wherein the light of the light source (32) is passed through and irradiated into the main-body (11) via the bottom-cover (12).

When the second magnetic-disk (33) is driven to rotate by the power piece (34), the first magnetic-pieces (211) of the first magnetic-disk (21) are magnetically attracted by the second magnetic-pieces (331) to rotate and drive the driving gear (212) to rotate; and the first gear (G1) meshing with the driving gear (212) is tugged to rotate. Since the second gear (G2) is combined with the first gear (G1), it will be rotated by the first gear (G1), thereby pulling the third gear (G3) and the tugging gear (G5) to rotate; and thus moving together the fluid toggling-disk (23) and the rotating-body (24) to rotate. Therefore, the fm-pieces (232) set by the fluid toggling-disk (23) are used to disturb the liquid inside the water-lamp main-body (1), so that the inner sequins and bright powders will flow with the liquid, thereby increasing the visually beautiful effect.

Figure 6:
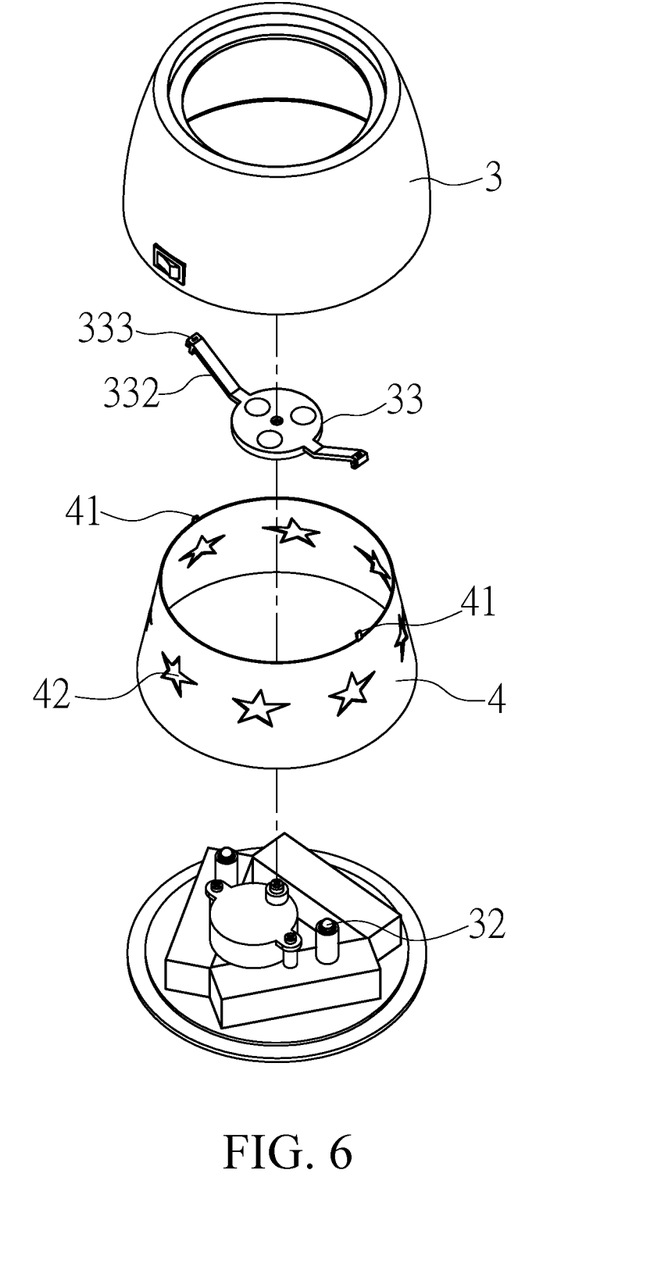
FIG. 6 is an exploded schematic diagram of the bottom seat of the embodiment of the present invention.
Figure 7:
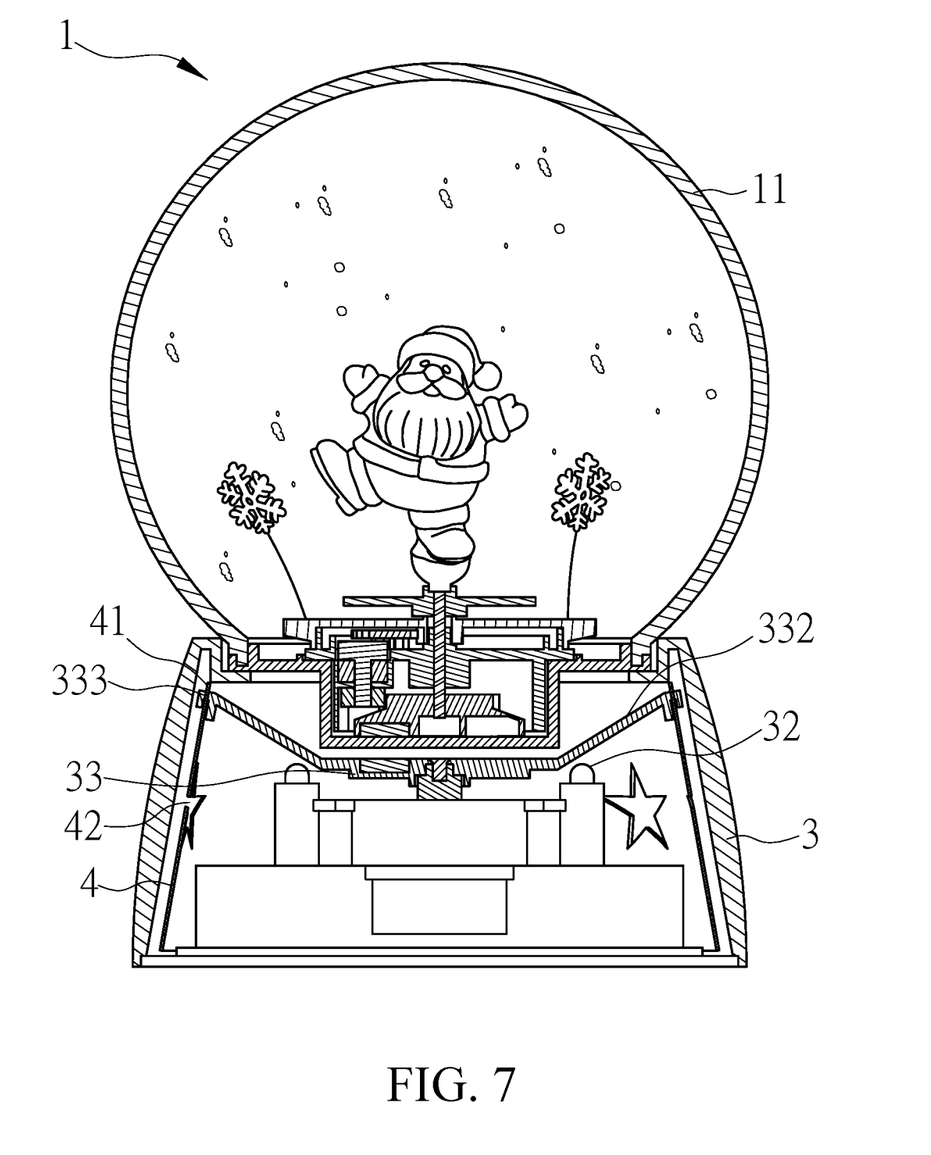
FIG. 7 is a sectional schematic diagram of the embodiment of the present invention.

Please continue to refer to FIG. 6 and FIG. 7, which is shown as an embodiment of the bottom seat (3) of the present invention; wherein the periphery of the second magnetic-disk (33) is set with a plurality of spaced apart wing portions (332). Each of the wing portions (332) is set with a insertion-hole (333), and further comprises a lamp-shade (4) ringly set on the inner edge of the bottom seat (3); wherein the lampshade (4) is set with a plurality of fixing portions (41), which the fixing portions (41) are combined with the insertion-holes (333); wherein the surface of the lampshade (4) is further set with a plurality of penetrated light-transmitting holes (42), and each of the light-transmitting holes (42) can be a geometric shape such as a circle, a polygon, a star, or the like, or a character, a word, or a symbol, . . . and other shapes.

Therefore, when the second magnetic-disk (33) rotates, the lampshade (4) will be rotated together; and the light-transmitting holes (42) are projected by the light of the light source (32) on the bottom seat (3), thereby letting the bottom seat (3) have a dynamic light and shadow effect.

I claim:

1. A rotation structure of a lamp decoration, which mainly comprises:

a water-lamp main-body suitably shaped to have a main-body that is hollow and transparent and has an opening and a transparent bottom-cover that closes the opening; wherein the main-body is internally filled with a slightly thick flowable liquid, and the bottom-cover is downwardly set with a recess;

a rotation mechanism set in the recess; wherein the rotation mechanism sequentially has a first magnetic-disk, a gear seat, a fluid toggling-disk, and a rotating-body;

wherein a plurality of first magnetic-pieces are set on the bottom of the first magnetic-disk, and a driving gear is set on the top of the first magnetic-disk;

wherein a driveshaft is upwardly set in the driving gear; wherein the gear seat is set with a platform fixed and set with the driveshaft, and the bottom of the platform is set with a first gear meshing with the driving gear; wherein a second gear is set on the top of the platform, and the bottom of the second gear is combined with the first gear;

wherein the fluid toggling-disk is set on the top of the gear seat, and a plurality of radial fin-pieces are set on the periphery of the fluid toggling-disk, wherein a tugging gear meshing with the gear seat is set on the bottom of the fluid toggling-disk;

wherein the driveshaft is passed through and set the fluid toggling-disk to combine with the rotating-body; and a bottom seat correspondingly fixed and connected under the water-lamp main-body, and the bottom seat has a upward opening; wherein a second magnetic-disk is set inside the bottom seat;

wherein the second magnetic-disk is set with a plurality of second magnetic-pieces having equal quantity and opposite magnetic orientation to the first magnetic-pieces; wherein a power piece is further set for driving the second magnetic-disk to rotate;

when the second magnetic-disk is under rotated state, the first magnetic-disk is magnetically attracted to rotate and drives the driving gear to rotate; thereby pulling the first gear, second gear, and the tugging gear to act, and thus moving together the fluid toggling-disk and the rotating-body to rotate.

2. The rotation structure of a lamp decoration according to claim 1, wherein a plurality of decorative pieces are set on the periphery of the fluid toggling-disk.

3. The rotation structure of a lamp decoration according to claim 1, wherein the periphery of the second magnetic-disk is set with a plurality of spaced apart wing portions, and each of the wing portions is set with a insertion-hole; and further comprises a lampshade ringly set on the inner edge of the bottom seat; wherein the lampshade is set with a plurality of fixing portions, which the fixing portions are combined with the insertion-holes; wherein the surface of the lampshade is further set with a plurality of penetrated light-transmitting holes.

4. The rotation structure of a lamp decoration according to claim 1, wherein the tugging gear is integrally extended by the fluid toggling-disk.

5. The rotation structure of a lamp decoration according to claim 1, wherein the driving gear is integrally extended by the second magnetic-disk.

6. The rotation structure of a lamp decoration according to claim 1, wherein the bottom seat is set with at least one light source, and the light source is irradiated toward the water-lamp main-body.

7. The rotation structure of a lamp decoration according to claim 1, wherein a third gear meshing with the second gear is further set on the top of the platform.

8. The rotation structure of a lamp decoration according to claim 7, wherein the bottom of the third gear is set with a transfer gear, and the third gear is meshed with the second gear by the transfer gear.

* * * * *